United States Patent [19]

Maurer et al.

[11] 4,453,002
[45] Jun. 5, 1984

[54] FORMALDEHYDE CONDENSATES AND THEIR PREPARATION

[75] Inventors: Werner Maurer; Johann Zimmer, both of Leverkusen; Artur Haus, Overath, all of Fed. Rep. of Germany

[73] Assignee: Bayer Aktiengesellschaft, Leverkusen, Fed. Rep. of Germany

[21] Appl. No.: 425,038

[22] Filed: Sep. 27, 1982

Related U.S. Application Data

[63] Continuation of Ser. No. 195,904, Oct. 10, 1980, abandoned.

[30] Foreign Application Priority Data

Oct. 31, 1979 [DE] Fed. Rep. of Germany ....... 2944090

[51] Int. Cl.$^3$ ..................... C07C 147/107; C08G 8/24
[52] U.S. Cl. ...................................... 562/429; 528/148
[58] Field of Search ........................ 562/429; 528/148

[56] References Cited

U.S. PATENT DOCUMENTS 4,196,109  4/1980  Laganis et al. .................... 525/491
4,216,299  8/1980  Kikuga et al. .................... 260/20

FOREIGN PATENT DOCUMENTS 939595  10/1963  United Kingdom .
939596  10/1963  United Kingdom .

Primary Examiner—Michael L. Shippen
Attorney, Agent, or Firm—Sprung, Horn, Kramer & Woods

[57] ABSTRACT

Condensation products which are obtained from formaldehyde, di-hydroxyaryl sulphones, phenols, if desired, and hydroxyarylcarboxylic acids and are prepared in a one-stage reaction at pH values between 2 and 5 are suitable as fixing agents for basic dyestuffs.

10 Claims, No Drawings

FORMALDEHYDE CONDENSATES AND THEIR PREPARATION

This is a continuation of application Ser. No. 195,904, filed Oct. 10, 1980, now abandoned.

The invention relates to condensation products of formaldehyde, di-hydroxyaryl sulphones, phenols, if desired, and hydroxyarylcarboxylic acids. The condensation products are characterised in that they are prepared in a one-stage reaction at pH values between 2 and 5.

The condensation products are preferably prepared in the absence of additional acids.

The reaction medium contains as the sole acid the carboxylic acid employed as a reactant, whilst known products are prepared in the presence of strong acids, for example mineral acids, as condensing agents.

4,4'-Dihydroxydiphenyl sulphone is of particular interest as the di-hydroxyaryl sulphone from an industrial point of view.

Examples of phenols which may be mentioned are phenol, cresols, chlorophenols, dihydroxybenzenes, p-hydroxydiphenyl and, in particular, o-hydroxydiphenyl.

By hydroxyarylcarboxylic acids there are preferably to be understood benzene derivatives. Of these, p-hydroxybenzoic acid, o-crestic acid and, in particular, salicylic acid are to be singled out.

Instead of the components mentioned, it is also possible to use mixtures thereof.

The preferred molar ratio of formaldehyde:dihydroxyaryl sulphone:phenol:hydroxyarylcarboxylic acid is 0.6–1.8:0.1–0.3:0–0.4:1, in particular 0.8–1.5:0.15–0.27:0.1–0.3:1.

The condensation reaction is preferably carried out at temperatures of 110°–120° C. and under pressures of 0.3–4.0 bars, in particular 1.0–2.5 bars.

The condensation products are used as fixing agents for basic dyestuffs in the textile industry, paper industry and leather industry. They can be employed as powders or solutions. In particular, they are used in alcoholic flexographic printing inks and gravure printing inks. They have an excellent fixing action, even in the case of dyestuffs which are difficult to fix, for example in the case of yellow dyestuffs of the auramine type. The products according to the invention also improve the resistance to water, especially of flexographic prints.

Condensation products of formaldehyde, dihydroxyaryl sulphones, hydroxyarylcarboxylic acids and, if desired, phenols and their use in the dyeing industry and printing industry are known from German Patent Specification 693,770 and German Auslegeschriften 1,088,518, 1,124,959 and 1,128,446.

The known products are prepared in the presence of strong acids, such as hydrochloric acid, sulphuric acid and p-toluenesulphonic acid, and with relatively large amounts of formaldehyde.

Compared with the nearest comparable products of these publications, the products according to the invention are distinguished by an increased solubility in alcohol. They are thus outstandingly suitable for the preparation of stable liquid commercial forms.

EXAMPLE 1

502 kg of 4,4'-dihydroxy-diphenyl sulphone, 262 kg of o-hydroxydiphenyl and 1,200 kg of salicylic acid are introduced into a stirred kettle containing 872 kg of 30% strength formaldehyde. The mixture is then heated to 115° C., whilst stirring. Venting of the kettle is throttled such that the pressure in the kettle is kept at 0.8–1.2 bars. The temperature and pressure are maintained for 3.5 hours. The kettle is then let down. The reaction mixture is subsequently treated with direct steam for 4–6 hours. The stirrer is then switched off. The condensation product separates out from the aqueous phase, as the lower phase. The condensation product is drained off hot at 100° C. onto drying plates and is dried at 80° C. in a vacuum drying cabinet. The dried product can readily be ground to a powder. It is used either as such or is dissolved, without grinding, in ethanol or ethanol/ethylglycol mixtures and used as a solution.

EXAMPLE 2

502 kg of 4,4'-dihydroxy-diphenyl sulphone, 262 kg of o-hydroxydiphenyl and 1,200 kg of salicylic acid are introduced into a stirred kettle containing 872 kg of 30% strength formaldehyde. The mixture is then heated to 115° C., whilst stirring. Venting of the kettle is throttled such that the pressure in the kettle is kept at 0.8–1.2 bars. The temperature and pressure are maintained for 3.5 hours. The kettle is then let down and the reaction mixture is subsequently treated with direct steam for 4–6 hours. Thereafter, the condensation product separates out from the aqueous phase, as the lower phase. The aqueous phase is decanted off. The condensation product is then dried in the stirred kettle by removal of water in vacuo. The dried product is drained off hot at 100° C. onto plates, on which it solidifies after a short time. The product is obtained in the form of a powder by grinding. Yield: about 2,000 kg. In order to prepare a liquid form, 170 kg of ethylglycol and 1,200 kg of ethyl alcohol are added to the product which has been dried in the kettle and has a residual water content of at most 5%, and the solvents are allowed to act at about 50° C. for 2 hours. 3,300 kg of an approximately 60% strength solution of the condensation product are thus obtained.

EXAMPLE 3

502 kg of 4,4'-dihydroxydiphenyl sulphone, 262 kg of o-hydroxydiphenyl and 1,200 kg of salicylic acid are introduced into a stirred kettle containing 740 kg of 30% strength formaldehyde. The mixture is then heated to 115° C., whilst stirring. Venting of the kettle is throttled such that the pressure in the kettle is kept at 0.8–1.2 bars. The temperature and pressure are maintained for 4.5 hours. The kettle is then let down and the reaction mixture is worked up as in Example 1 or 2.

EXAMPLE 4

502 kg of 4,4'-dihydroxy-diphenyl sulphone, 262 kg of o-hydroxydiphenyl and 1,200 kg of salicylic acid are introduced into a stirred kettle containing 1,130 kg of 30% strength formaldehyde. The mixture is then heated to 110° C., whilst stirring. Venting of the kettle is throttled such that the pressure in the kettle is kept at 0.6–1.2 bars. The temperature and pressure are maintained for 1–2 hours. The kettle is then let down and the reaction mixture is worked up as in Example 1 or 2.

EXAMPLE 5

578 kg of 4,4'-dihydroxy-diphenyl sulphone, 262 kg of o-hydroxydiphenyl and 1,200 kg of salicylic acid are introduced into a stirred kettle containing 872 kg of 30% strength formaldehyde. The mixture is then heated to 115° C., whilst stirring. Venting of the kettle is throttled such that the pressure in the kettle is kept at 0.8 to 1.2 bars. The temperature and pressure are maintained for 3.5 hours. Thereafter, the reaction mixture is treated with direct steam for 4 hours. The stirrer is then switched off and the product which has settled at the bottom is drained off onto drying plates and dried at 80° C. in a vacuum drying cabinet. The dried product is either ground to a powder or dissolved, without grinding, in ethanol or ethanol/ethylglycol mixtures.

EXAMPLE 6

502 kg of 4,4'-dihydroxy-diphenyl sulphone, 320 kg of o-hydroxydiphenyl and 1,200 kg of salicylic acid are introduced into a stirred kettle containing 872 kg of 30% strength formaldehyde. The mixture is then warmed to 115° C., whilst stirring. Venting of the kettle is throttled such that the pressure in the kettle is kept at 0.8-1.2 bars. The temperature and pressure are maintained for 3.5 hours. Thereafter, the reaction mixture is treated with direct steam for 4 hours. The stirrer is then switched off and the product is worked up as in Example 1 or 2.

EXAMPLE 7

440 kg of 4,4'-dihydroxy-diphenyl sulphone, 215 kg of o-hydroxydiphenyl and 1,200 kg of salicylic acid are introduced into a stirred kettle containing 872 kg of 30% strength formaldehyde. The mixture is then heated to 115° C., whilst stirring. Venting of the kettle is throttled such that the pressure in the kettle is kept at 0.8-1.2 bars. The temperature and pressure are maintained for 4.5 hours. Thereafter, the kettle is let down and the stirrer is switched off. The aqueous upper phase is decanted off. The condensation product is dried at 110° C. in vacuo in the stirred kettle, to a residual water content of <5%. 1,200 kg of ethanol are added to the dried product and the mixture is stirred at 50° C. for 2 hours. 3,100 kg of an approximately 60% strength solution of the condensation product, which can be used in this form, are obtained.

EXAMPLE 8

502 kg of 4,4'-dihydroxy-diphenyl sulphone, 320 kg of o-hydroxydiphenyl and 1,100 kg of salicylic acid are introduced into a stirred kettle containing 872 kg of 30% strength formaldehyde solution. The mixture is then heated to 115° C., whilst stirring. Venting of the kettle is throttled such that the pressure in the kettle is kept at 0.8-1.2 bars. The temperature and pressure are maintained for 4.5 hours. The kettle is then let down. The reaction mixture is treated with direct steam for 6 hours. The stirrer is then switched off. The aqueous upper phase is decanted off. The condensation product is dried at 100° C. in vacuo in the stirred kettle, to a residual water content of <5%. 500 kg of ethylglycol and 850 kg of ethanol are added to the dried product and the mixture is stirred at 50° C. for 2 hours. 3,300 kg of an approximately 60% strength solution of the condensation product are obtained.

EXAMPLE 9

502 kg of 4,4'-dihydroxydiphenyl sulphone, 262 kg of o-hydroxydiphenyl and 1,200 kg of 4-hydroxybenzoic acid are introduced into a stirred kettle containing 872 kg of 30% strength formaldehyde. The mixture is then heated to 115° C., whilst stirring. Venting of the kettle is throttled such that the pressure in the kettle is kept at 1.5-2.0 bars. The temperature and pressure are maintained for 3.5 hours. Thereafter, the kettle is let down and the stirrer is switched off. The condensation product separates out from the aqueous phase, as the lower phase. The condensation product is drained off hot at 100° C. onto drying plates and is dried at 80° C. in a vacuum drying cabinet. The dried product is either ground to a powder or dissolved, without grinding, in ethanol or ethanol/ethylglycol mixtures.

EXAMPLE 10

502 kg of 4,4'-dihydroxydiphenyl sulphone, 262 kg of o-hydroxydiphenyl, 960 kg of salicylic acid and 264 kg of o-cresotic acid are introduced into a stirred kettle containing 872 kg of 30% strength formaldehyde. The mixture is then heated to 120° C. Venting of the kettle is throttled such that the pressure in the kettle is kept at 1.5-3.0 bars. The temperature and pressure are maintained for 2.5 hours. Thereafter, the kettle is let down and the reaction mixture is worked up as in Example 1 or 2.

EXAMPLE 11

502 kg of 4,4'-dihydroxydiphenyl sulphone, 145 kg of phenol and 1,200 kg of salicylic acid are introduced into a stirred kettle containing 872 kg of 30% strength formaldehyde. The mixture is then heated to 105°-110° C., whilst stirring. Venting of the kettle is throttled such that the pressure in the kettle is kept at 0.5 to 1.5 bars. The temperature and pressure are maintained for 6 hours. Thereafter, the kettle is let down and the reaction mixture is worked up as in Example 1 or 2.

EXAMPLE 12

502 kg of 4,4'-dihydroxydiphenyl sulphone, 50 kg of pyrocatechol and 1,200 kg of salicylic acid are introduced into a stirred kettle containing 872 kg of 30% strength formaldehyde. The mixture is then heated to 115° C., whilst stirring. Venting of the kettle is throttled such that the pressure in the kettle is kept at 1.5-2.0 bars. The temperature and pressure are maintained for 4 hours. Thereafter, the kettle is let down and the reaction mixture is worked up as in Example 9.

EXAMPLE 13

502 kg of 4,4'-dihydroxydiphenyl sulphone and 1,410 kg of salicylic acid are introduced into a stirred kettle containing 872 kg of 30% strength formaldehyde. The mixture is then heated to 120° C., whilst stirring. Venting of the kettle is throttled such that the pressure in the kettle is kept at 1.5-3.0 bars. The temperature and pressure are maintained for 4 hours. Thereafter, the kettle is let down and the reaction mixture is worked up as in Example 9.

We claim:

1. A condensation product of formaldehyde; di-hydroxyaryl sulphone; optionally a phenol selected from the group consisting of phenol, cresol, chlorophenol, dihydroxybenzenes, p-hydroxydiphenyl and o-hydroxydiphenyl; and hydroxyarylcarboxylic acid selected from the group consisting of p-hydroxybenzoic acid, o-cresotic acid and salicylic acid, the molar ratio of formaldehyde:di-hydroxyaryl sulphone:phenol:hydroxyarylcarboxylic acid being 0.6-1.8:0.1-0.3:0-0.4:1, the product being prepared in the absence of additional acids in a one-stage reaction at a pH between about 2 and 5.

2. A condensation product according to claim 1 wherein said molar ratio is 0.8–1.5:0.15–0.27:0.1–0.3:1.

3. A condensation product according to claim 1 wherein the di-hydroxyaryl sulphone is 4,4'-dihydroxydiphenyl sulphone.

4. A condensation product according to claim 1 wherein the product is prepared at a temperature between about 100° C. and 130° C.

5. A condensation product according to claim 1 wherein the product is prepared at a pressure between about 0.3 bar and 4 bar.

6. A condensation product according to claim 5 wherein the pressure is between about 1 bar and 2.5 bar.

7. A process for the preparation of a condensation product of formaldehyde; di-hydroxyaryl sulphone; optionally a phenol selected from the group consisting of phenol, cresol, chlorophenol, dihydrobenzenes, p-hydroxydiphenyl and o-hydroxydiphenyl; and a hydroxyarylcarboxylic acid selected from the group consisting of p-hydroxybenzoic acid, o-cresotic acid and salicylic acid, the molar ratio of formaldehyde:di-hydroxyaryl sulphone:phenol:hydroxyarylcarboxylic acid being 0.6–1.8:0.1–0.3:0–0.4:1, comprising heating the reactants in the absence of additional acids in a one-stage reaction at a pH between about 2 and 5.

8. A process according to claim 7 wherein the reactants are heated at a temperature between about 100° C. and 130° C.

9. A process according to claim 7 wherein the reaction is effected at a pressure of between about 0.3 bar and 4.0 bar.

10. A process according to claim 9 wherein the pressure is between 1.0 bar and 2.5 bar.

* * * * *